(12) United States Patent
Thompson et al.

(10) Patent No.: US 8,523,106 B2
(45) Date of Patent: Sep. 3, 2013

(54) NOSE LANDING GEAR ARRANGEMENT WITH A COLLAPSIBLE SUPPORT STRUCTURE DESIGNED TO MINIMIZE THE STOWED VOLUME OF THE LANDING GEAR

(75) Inventors: Robert I. Thompson, Bristol (GB); Nicholas J. White, Bristol (GB)

(73) Assignee: Airbus Operations Limited, Bristol (GB)

( * ) Notice: Subject to any disclaimer, the term of this patent is extended or adjusted under 35 U.S.C. 154(b) by 280 days.

(21) Appl. No.: 12/690,272

(22) Filed: Jan. 20, 2010

(65) Prior Publication Data
US 2010/0181422 A1 Jul. 22, 2010

(30) Foreign Application Priority Data

Jan. 20, 2009 (GB) .................................. 0900815.2

(51) Int. Cl.
*B64C 25/10* (2006.01)
(52) U.S. Cl.
USPC ................................... 244/102 A; 244/102 R
(58) Field of Classification Search
USPC ............................. 244/102 A, 102 SL, 102 R
IPC ........................................................ B64C 25/10
See application file for complete search history.

(56) References Cited

U.S. PATENT DOCUMENTS

| | | | | | |
|---|---|---|---|---|---|
| 2,497,415 | A | * | 2/1950 | Parker | 244/102 SL |
| 2,535,167 | A | * | 12/1950 | Smith et al. | 244/50 |
| 2,668,030 | A | * | 2/1954 | Smith et al. | 244/102 SL |
| 2,754,072 | A | * | 7/1956 | Shapiro | 244/102 SS |
| 3,904,153 | A | * | 9/1975 | Watts | 244/50 |
| 4,170,332 | A | * | 10/1979 | Masclet et al. | 244/102 R |
| 4,189,117 | A | * | 2/1980 | Masclet et al. | 244/102 R |
| 4,328,939 | A | * | 5/1982 | Davies et al. | 244/102 R |
| 4,345,727 | A | * | 8/1982 | Brown et al. | 244/102 R |
| 4,556,179 | A | * | 12/1985 | Veaux et al. | 244/102 R |

(Continued)

FOREIGN PATENT DOCUMENTS

| | | |
|---|---|---|
| EP | 0 031 602 | 12/1979 |
| EP | 1632431 A2 | 3/2006 |
| FR | 2801865 A1 | 6/2001 |

OTHER PUBLICATIONS

UK Search Report for GB0900815.2 dated May 6, 2009.

*Primary Examiner* — Joseph W Sanderson
*Assistant Examiner* — Timothy Schwarz
(74) *Attorney, Agent, or Firm* — Lowe Hauptman & Berner, LLP

(57) ABSTRACT

A nose landing gear arrangement including a leg assembly with a pivot axis A at one end thereof and a landing gear wheel mounting at the other end thereof. Two stays are provided, each stay being mounted at one end thereof to the leg assembly and mountable at the other end thereof to an aircraft. Each stay includes an upper stay part and a lower stay part which are hinged together by means of a simple hinge. The upper stay part has a cardan joint at its end spaced from the hinge to enable hinged mounting to an aircraft. The lower stay part has a cardan joint at its lower end spaced from the hinge, the cardan joint of the lower stay part hingedly mounting the lower stay part to the leg assembly. The leg assembly and the stays are arranged so that the stays extend from the leg assembly on opposite sides thereof and the stays fold into a stowed position so that they lie substantially alongside the leg assembly when the leg assembly is retracted.

9 Claims, 4 Drawing Sheets

(56) References Cited

U.S. PATENT DOCUMENTS

Figure 1:
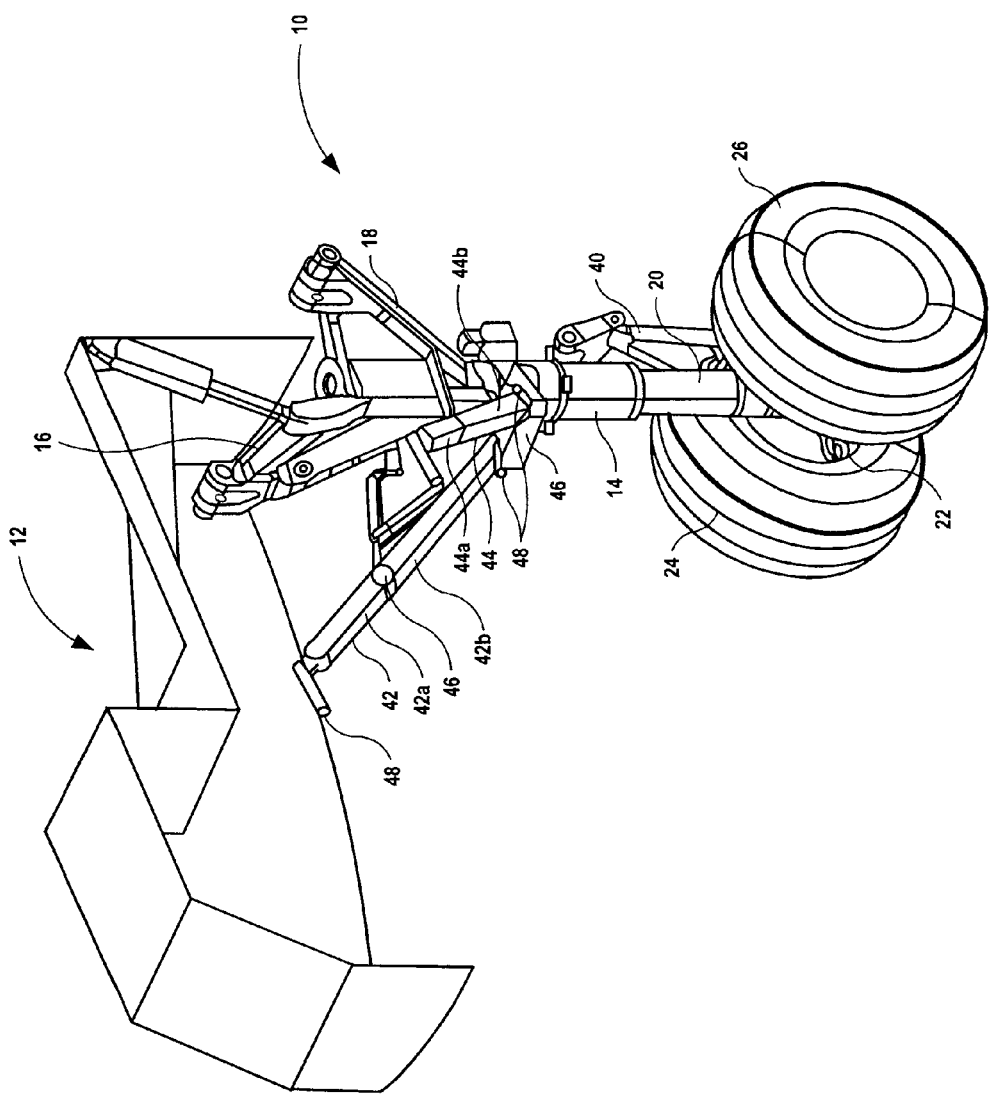

| | | | | |
|---|---|---|---|---|
| 5,269,481 A | * | 12/1993 | Derrien | 244/102 R |
| 5,839,692 A | | 11/1998 | Ralph et al. | |
| 5,875,994 A | * | 3/1999 | McCrory | 244/102 A |
| 7,708,225 B2 | * | 5/2010 | Thulbon | 244/102 SL |
| 8,070,094 B2 | * | 12/2011 | Collins | 244/102 A |
| 2003/0122034 A1 | * | 7/2003 | Pancotti | 244/102 R |
| 2006/0237584 A1 | * | 10/2006 | Hinton | 244/102 R |
| 2008/0142634 A1 | * | 6/2008 | Moe et al. | 244/1 N |
| 2009/0014582 A1 | * | 1/2009 | De Ruffray et al. | 244/102 R |

* cited by examiner

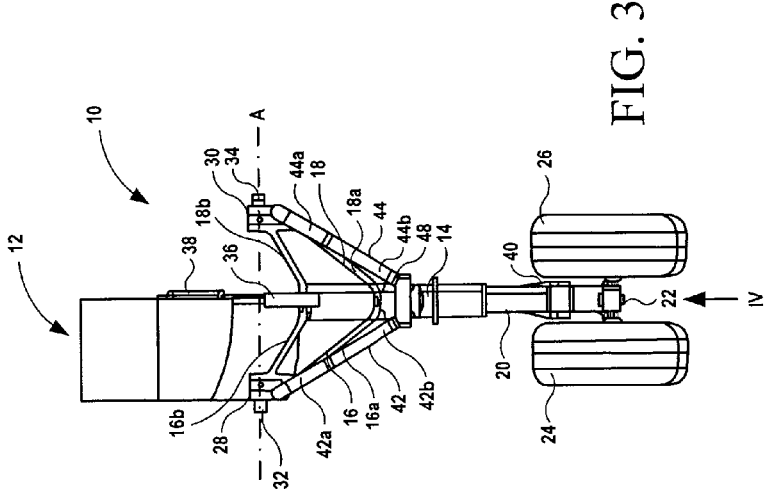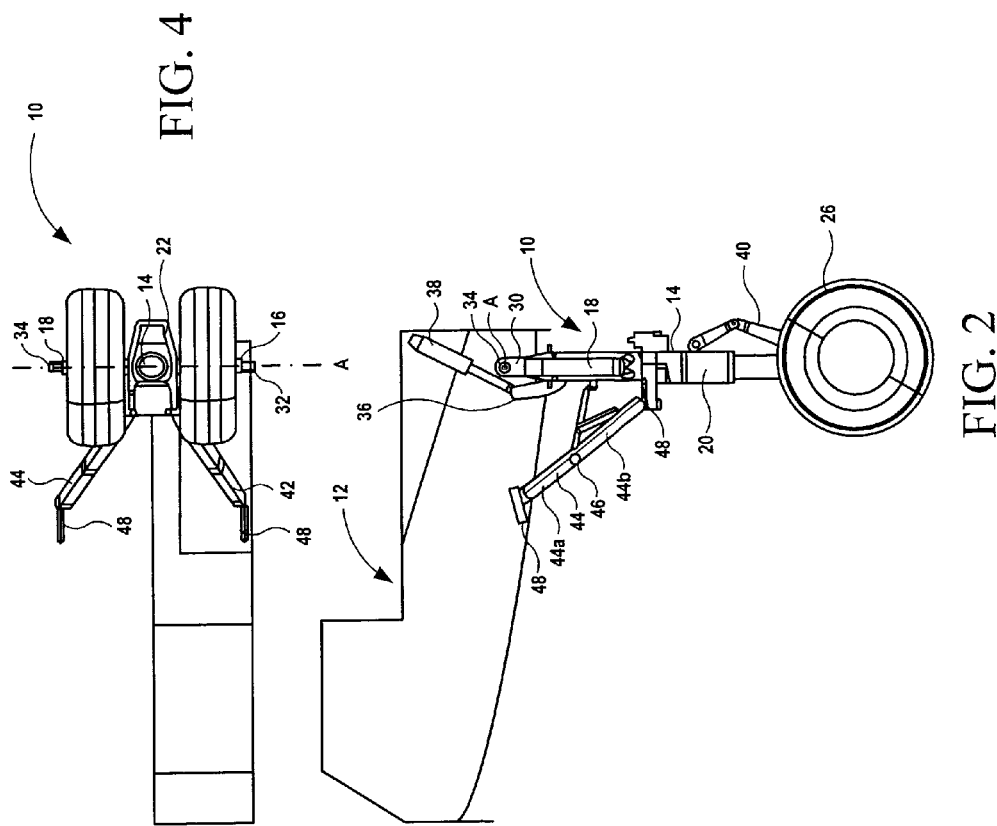

NOSE LANDING GEAR ARRANGEMENT WITH A COLLAPSIBLE SUPPORT STRUCTURE DESIGNED TO MINIMIZE THE STOWED VOLUME OF THE LANDING GEAR

RELATED APPLICATIONS

The present application is based on, and claims priority from, British Application Number 0900815.2, filed Jan. 20, 2009, the disclosure of which is hereby incorporated by reference herein in its entirety.

FIELD OF THE INVENTION

The invention relates to a nose landing gear arrangement, most particularly for use in aircraft that have a tricycle landing gear arrangement.

BACKGROUND OF THE INVENTION

A nose landing gear of an aircraft is generally stored within a volume within the forward section of the aircraft fuselage so as to reduce aerodynamic effects that might penalise the performance of the aircraft. The area around the nose landing gear is the nose landing gear bay. Also, occupying the available volume within the forward section of the aircraft are electronic assemblies, including avionics, radar equipment, and the flight deck. The shape of the nose fuselage influences the performance of the aircraft. If the volume of equipment required to be stored within the nose fuselage is minimised then there is more flexibility to produce a more efficient shape for that fuselage and improve aircraft performance. Also, the walls of the nose landing gear bay are subject to pressurisation and need to be reinforced to contain that pressure. If the pressurised surface area and nose landing gear bay is reduced, then so is the reinforcement needed and hence the mass of the nose landing gear bay.

Typically nose landing gear will have a leg assembly on which there is a pivot which allows the leg assembly to be rotated and stowed in a nose landing gear bay. To restrain the leg assembly and prevent the nose landing gear assembly from collapsing when the aircraft is on the ground or being pushed back when the aircraft is in the air by aerodynamic forces, conventional nose landing gear commonly have a long stay assembly. The stay assembly is normally attached at one end to the aircraft at a point substantially forward and above the nose landing gear assembly and at the other to a point on the nose landing gear leg. The attachment point of the stay assembly to the aircraft and the attachment point of the stay assembly to a leg, both normally lie on axes that are parallel to the axis of the leg assembly pivot.

The stay assembly normally comprises an upper and lower stay member which can fold about a central hinge. When the leg is deployed, the stay assembly is prevented from folding by a locking arrangement which prevents the nose landing gear from being rotated up inside the nose fuselage.

Typically, in a nose landing gear bay, the upper attachment point of the stay assembly on the aircraft structure and the nose landing gear leg attachment to the aircraft are connected together by a reinforced aircraft structure. If the distance between those two points is large then an unnecessary additional weight is added to the aircraft. Keeping the distance small reduces the weight impact on the aircraft so there will be less additional reinforced aircraft structure.

In a conventional arrangement, when the nose landing gear is rotated up inside the nose fuselage during normal flight, the leg is stowed in the nose fuselage with the stay assembly folded above the leg assembly. This increases the nose landing gear bay volume required due to the additional height required within the nose landing gear bay to enclose the folded stay assembly.

It is an object of the present invention to provide an improved nose landing gear arrangement.

SUMMARY OF THE INVENTION

According to a first aspect of the invention, there is provided a nose landing gear arrangement for an aircraft, the nose landing gear arrangement comprising a leg assembly having a pivot axis at one end thereof and a landing gear wheel mounting at the other end thereof and two stays, each stay being mounted at one end thereof to the leg assembly and being mountable at the other end thereof to an aircraft, each stay comprising an upper stay part and a lower stay part hinged together, the upper stay part having a cardan joint at its end spaced from the hinge to enable hinged mounting to an aircraft and the lower stay part having a cardan joint at its end spaced from the hinge, a cardan joint of the lower stay part hingedly mounting the lower stay part to the leg assembly, the leg assembly and stays being arranged so that the stays extend from the leg assembly on opposite sides thereof and the stays fold into a stowed position so that they lie substantially alongside the leg assembly when the leg assembly is retracted.

In that way, when the nose landing gear is retracted, the stays are arranged on either side of the nose landing gear leg rather than above it. That reduces the required minimum depth of the nose landing gear bay, which, in turn, provides greater flexibility to the aircraft designer in designing the nose fuselage.

According to another aspect of the invention, there is provided an aircraft having a nose landing gear arrangement, the nose landing gear arrangement having a stowed condition in which it is received within a nose landing gear bay and a deployed condition in which it extends out of the bay, the nose landing gear arrangement comprising a leg assembly having a pivot axis at one end thereof and a landing gear wheel mounting at the other end thereof, and two stays, each stay being mounted at one end thereof to the leg assembly and at the other end thereof to the aircraft, each stay comprising an upper stay part and a lower stay part hinged together, the upper stay part having a cardan joint at its end spaced from the hinge to mount the stay to the aircraft and the lower stay part having a cardan joint at its end spaced from the hinge, the cardan joint of the lower stay part hingedly mounting the lower stay part to the leg assembly, the leg assembly and stays being arranged so that the stays extend from the leg assembly on opposite sides thereof when the nose landing gear arrangement is in its deployed condition and the stays fold so as to lie substantially alongside the leg assembly when the nose landing gear arrangement is in its stowed condition.

A nose landing gear arrangement in accordance with the invention will now be described in detail by way of example and with reference to the accompanying drawings, in which:—

Figure 5:
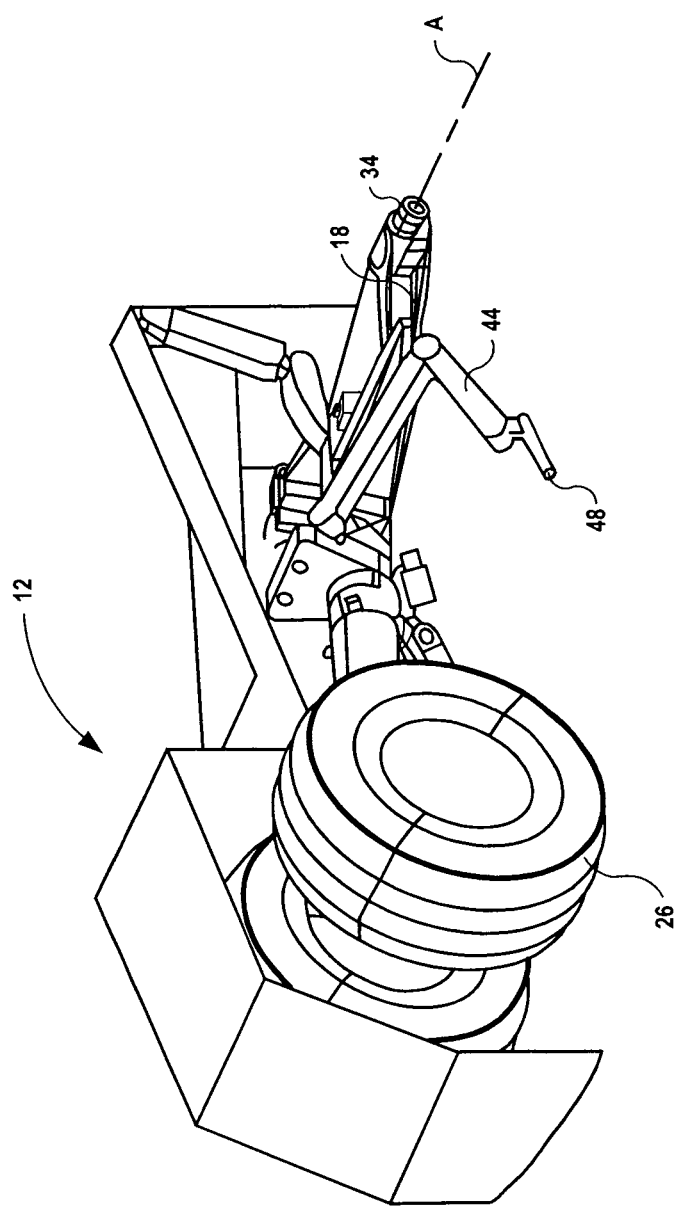
Figure 6:
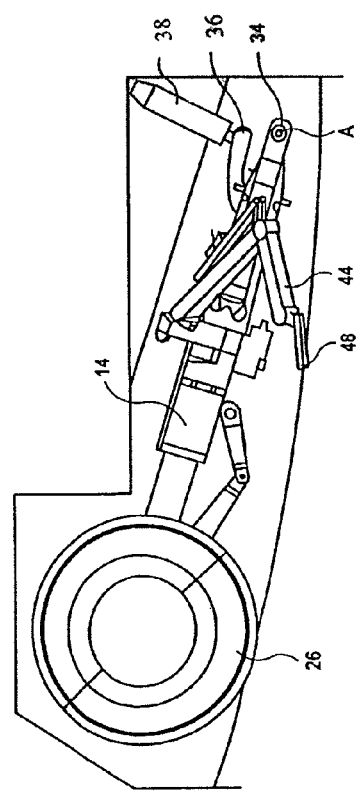

FIG. 1 is a perspective view of a nose landing gear arrangement in accordance with the invention shown in a deployed condition, FIG. 2 is a side elevation of a nose landing gear of FIG. 1 shown in a deployed condition, FIG. 3 is a front elevation of the nose landing gear of FIGS. 1 and 2 shown in a deployed condition, FIG. 4 is a plan view from beneath the nose landing gear of FIGS. 1 to 3 looking in the direction of arrow IV in FIG. 3 shown in a deployed condition, FIG. 5 is a perspective view of the nose landing gear arrangement of FIGS. 1 to 4 shown in the stowed condition, FIG. 6 is a side elevation of nose landing gear of FIGS. 1 to 5 shown in the stowed condition.

Figure 7:
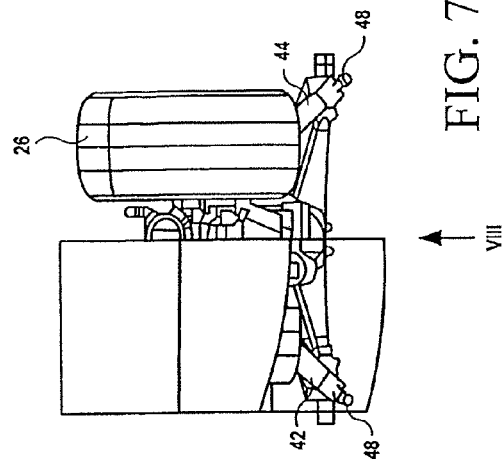
Figure 8:
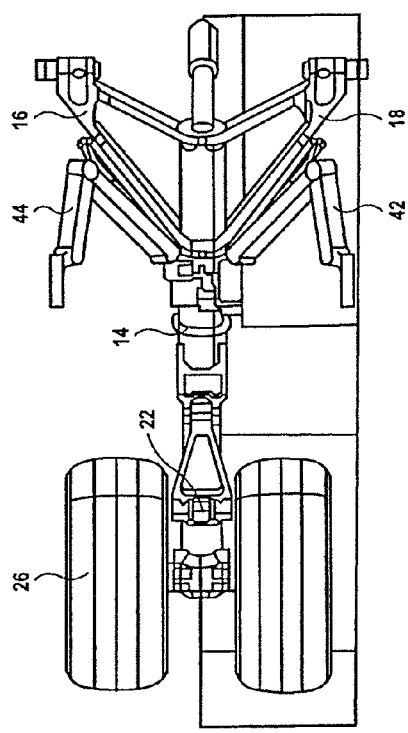

FIG. 7 is an end elevation of the nose landing gear arrangement of FIGS. 1 to 6 shown in the stowed condition, and FIG. 8 is a plan view of the nose landing gear arrangement of FIGS. 1 to 7 looking in the direction of arrow VIII in FIG. 7 shown in the stowed condition.

A nose landing gear arrangement 10 in accordance with the invention is shown in FIGS. 1 to 4 in a deployed condition.

In FIG. 1 the nose landing gear arrangement 10 is shown deployed from a nose landing gear bay 12, part of which is cut away for clarity.

The nose landing gear arrangement 10 comprises a nose landing gear leg 14 which has a pair of side braces 16, 18 at the upper part thereof. The lower end of the leg 14 comprises a shock absorber arrangement 20 of known form. A wheel mounting 22 is arranged at the bottom of the shock absorber 20 and the wheel mounting 22 carries two wheels 24, 26, one on either side of the leg 14.

Each side brace 16, 18 comprises a main side brace arm 16a, 18a which extends from a position on the leg 14 spaced slightly from the top of the leg 14. Side brace support arms 16b, 18b respectively extend from the upper/outer ends of the side brace arms 16a, 18a and are connected to the nose landing gear leg 14 at the top thereof. At the point where the side brace arm 16a meets the support arm 16b, a pivot mounting 28 is provided. Likewise, where the side brace arm 18a and the support arm 18b meet, another pivot mounting 30 is provided. The pivot mountings 28, 30 mount pivot pins 32, 34 respectively and the pivot arms are coaxial about the axis A.

The pivot pins 32, 34 are, in turn, mounted to the nose landing gear bay to allow the nose landing gear arrangement to pivot about them into the bay 12. A lug 36 projects from an upper part of the leg 14 forwardly thereof from a point beneath the axis A. The free end of the lug 36 is connected to one end of an actuator 38 which is mounted to the aircraft fuselage within the bay 12. A set of torque links 40 extends from the wheel mount 22 rearwardly thereof for connection to a steering mechanism (not shown).

Two stays 42, 44 extend from a collar at around the mid point of the nose landing gear leg 14. The stays 42, 44, when the nose landing gear is in the deployed condition, are angled respectively to the main side brace arms 16a, 18a. Each stay 42 comprises an upper stay part 42a, 44a and a lower stay part 42b, 44b. The two parts 42a, 42b 44a, 44b are hinged together by means of a simple hinge 46. The upper stay parts 42a, 44a are mounted to and articulated relative to the fuselage by means of cardan joints 48. The cardan joints allow the upper parts 42a, 44a to rotate about two generally perpendicular axes.

The lower end of the lower part 42b, 44b are connected to the collar 46 by means of cardan joints 48. Again, those cardan joints allow the lower parts to rotate about two generally perpendicular axes.

By mounting the upper and lower parts of the stays 42, 44 to the fuselage and nose landing gear leg with cardan joints, the stays 42, 44 can fold away to either side of the nose landing gear leg when the leg is retracted.

FIGS. 5 to 8 illustrate the nose landing gear assembly 10 in its retracted condition. In order to retract the landing gear the actuator 38 is actuated to pull the lug 36 upwardly, in turn causing the nose landing gear leg 14 to pivot about the axis A upwardly into the nose landing gear bay 12. As can be seen most clearly in FIGS. 5, 6 and 8, as the nose landing gear leg 14 pivots about axis A upwardly into the nose landing gear bay 12, the stays 42, 44 rotate about the simple hinge between their respective upper and lower parts 42a, 44a, 42b, 44b and the cardan joints 48 allow the stay parts to twist and fold away to either side of the nose landing gear leg 14.

In that way, by removing the need to have the folded stay accommodated above the nose landing gear leg 14, the overall space taken up by the nose landing gear bay 12 is minimised.

The design of the stays 42, 44 with the simple hinge in the middle and the cardan joints at either end allows the stay to be provided but at the same time it folds away compactly within the previous envelope defined by the nose landing gear.

Looking at FIG. 8, it can be seen that the lower parts 42b, 44b of the stays 42, 44 extend adjacent to and substantially along side the side braces 16, 18. The upper parts lie substantially along side the vertical wall of the nose landing gear bay 12, as shown in FIG. 6. By adopting that configuration the stay is provided without the need for additional room within the nose landing gear bay. It is not sufficient to move the problem from one area to another, i.e. from above the retracted nose landing gear leg 14 to a side thereof. In the present invention, the retracted nose landing gear takes up the same foot print that the retracted landing gear with the traditional stay would have taken up when viewed in plan but when viewed in profile as in FIG. 6, less space is taken. Also, because the stay attachments are arranged close to the surface of the fuselage, the extent of reinforcing structure required is reduced compared to the conventional arrangement, which in turn reduces the weight of the entire nose landing gear arrangement.

The invention claimed is:

1. A nose landing gear arrangement for an aircraft, the nose landing gear arrangement comprising a leg assembly having a pivot axis at one end thereof and a landing gear wheel mounting at the other end thereof and two stays, each stay being mounted at one end thereof to the leg assembly and being mountable at the other end thereof to an aircraft, each stay comprising an upper stay part and a lower stay part hinged together, the upper stay part having a cardan joint at one end spaced from the hinge to enable hinged mounting to an aircraft and the lower stay part having a cardan joint at one end spaced from the hinge, a cardan joint of the lower stay part hingedly mounting the lower stay part to the leg assembly, the leg assembly and stays being arranged so that the stays extend from the leg assembly on opposite sides thereof and the stays fold into a stowed position so that they lie substantially alongside the leg assembly when the leg assembly is retracted.

2. A nose landing gear arrangement according to claim 1 in which the leg assembly has a side brace arrangement defining the pivot axis.

3. A nose landing gear arrangement according to claim 2 in which the lower stay parts are arranged substantially alongside the side brace arrangement when the nose landing gear is retracted.

4. A nose landing gear arrangement according to claim 1 in which the stays do not protrude substantially beyond the width of the leg assembly.

5. An aircraft having a nose landing gear arrangement, the nose landing gear arrangement having a stowed condition in which it is received within a nose landing gear bay and a deployed condition in which it extends out of the bay, the nose landing gear arrangement comprising a leg assembly having a pivot axis at one end thereof and a landing gear wheel mounting at the other end thereof, and two stays, each stay being mounted at one end thereof to the leg assembly and at the other end thereof to the aircraft, each stay comprising an upper stay part and a lower stay part hinged together, the upper stay part having a cardan joint at one end spaced from the hinge to mount the stay to the aircraft at an aircraft mounting part and the lower stay part having a cardan joint at one end spaced from the hinge, the cardan joint of the lower stay part hingedly mounting the lower stay part to the leg assembly, the leg assembly and stays being arranged so that the stays extend from the leg assembly on opposite sides thereof when the nose landing gear arrangement is in a deployed condition and the stays fold so as to lie substantially alongside the leg assembly when the nose landing gear arrangement is in a stowed condition.

6. An aircraft according to claim 5 in which the aircraft mounting point is adjacent the fuselage skin of the aircraft.

7. An aircraft according to claim 5 in which the leg assembly has a side brace arrangement defining the pivot axis.

8. An aircraft according to claim 7 in which the lower stay parts are arranged substantially alongside the side brace arrangement when the nose landing gear is retracted.

9. An aircraft according to claim 5 in which the stays do not protrude substantially beyond the width of the leg assembly.

\* \* \* \* \*